(12) United States Patent
Shah et al.

(10) Patent No.: US 9,825,443 B2
(45) Date of Patent: Nov. 21, 2017

(54) POWER TRANSFER UNIT

(71) Applicant: ARCHITECTURAL BUILDERS HARDWARE MFG., INC., Itasca, IL (US)

(72) Inventors: Ankit Kirti Shah, Chicago, IL (US); Kanav Mahesh Chhatbar, South Barrington, IL (US)

(73) Assignee: ARCHITECTURAL BUILDERS HARDWARE MFG., INC., Itasca, IL (US)

( * ) Notice: Subject to any disclaimer, the term of this patent is extended or adjusted under 35 U.S.C. 154(b) by 0 days.

(21) Appl. No.: 15/602,072

(22) Filed: May 22, 2017

(65) Prior Publication Data
US 2017/0264090 A1 Sep. 14, 2017

Related U.S. Application Data

(63) Continuation-in-part of application No. 15/174,866, filed on Jun. 6, 2016, now Pat. No. 9,660,427, which is a continuation-in-part of application No. 29/555,293, filed on Feb. 19, 2016.

(51) Int. Cl.
*H02G 3/04* (2006.01)
*H02G 3/22* (2006.01)
*H01B 7/18* (2006.01)

(52) U.S. Cl.
CPC .............. *H02G 3/0406* (2013.01); *H01B 7/18* (2013.01); *H02G 3/0481* (2013.01); *H02G 3/22* (2013.01)

(58) Field of Classification Search
USPC .................................. 174/86; 439/31; 49/167
See application file for complete search history.

(56) References Cited

U.S. PATENT DOCUMENTS

| | | | |
|---|---|---|---|
| 3,848,361 A * | 11/1974 | Foster | E05D 11/0081 16/223 |
| 4,445,299 A * | 5/1984 | Lehikoinen | D06F 39/14 174/86 |
| 5,690,501 A | 11/1997 | Mader | |
| 8,448,382 B2 * | 5/2013 | Rodgers | E06B 7/28 49/167 |

OTHER PUBLICATIONS http://www/abhmfg.com/p/6l/pt200pt1000-power-transfer, PCT200/PT1000 Power Transfer Power Transfer.

* cited by examiner

*Primary Examiner* — Dhirubhai R Patel
(74) *Attorney, Agent, or Firm* — Benesch, Friedlander, Coplan & Aronoff LLP (57) ABSTRACT

A power transfer unit is disclosed. In a first implementation of the disclosed power transfer unit, a tubular assembly of the power transfer unit includes an encapsulated elbow hinge design with a reduced profile that permits substantially off-center installation of the housings of the power transfer unit. In a second implementation of the disclosed power transfer unit, the tubular assembly includes an inverted, telescoping tubing design that does not come apart during installation and use, and in some implementations may act as a stop for a closable member.

19 Claims, 10 Drawing Sheets

POWER TRANSFER UNIT

CROSS-REFERENCE TO RELATED APPLICATIONS

This application is a continuation of and claims the benefit of U.S. patent application Ser. No. 15/174,866, filed Jun. 6, 2016, now U.S. Pat. No. 9,660,427 which is a continuation-in-part of and claims the benefit of U.S. Design patent application No. 29/555,293, filed Feb. 19, 2016, each of which is incorporated herein by reference in its entirety.

TECHNICAL FIELD

The present invention relates to power transfer units for transferring electric power or signals from a closable member to a frame, and more particularly, to a tubular assembly for a power transfer unit.

BACKGROUND

In many applications of a door or other closable member, it is necessary to pass electrical power, data, or signaling from a frame to the door using electrical wiring. For example, electrically operated door locks with security devices (e.g., card readers, biometric readers, RFID readers, etc. . . . ), remote-controlled door locks, and door-mounted lights may require electrical power or signaling wiring that passes from the frame to the door. This requires the use of flexible wiring that extends across the gap between a door and frame. Because the wiring extends across a gap and may change in direction and width as the door swings open and closed, the wiring may be strained, pinched, or otherwise damaged. Moreover, the wiring may be tampered with if it is not concealed.

Electrical power transfer units provide a means of protecting this wiring and transferring electrical power or data from a frame to a door in a secure and discreet manner. A problem with conventional power transfer units is that they require near perfect installation of the door housing and doorframe housing such that they close on "center" when the door is closed so that the openings for the wirings within the door housing and doorframe are completely aligned when in the closed configuration. In such conventional designs, if the installation is not precisely centered (e.g., off by as little as $\frac{1}{16}^{th}$ of an inch), the components of the conventional power transfer unit may rub/contact each other, which may lead to premature wearing of the parts or may interfere with the operation of the door.

SUMMARY OF THE DISCLOSURE

In various embodiments, a power transfer unit that addresses the aforementioned problems is disclosed.

In a first embodiment, a tubular assembly for a power transfer unit includes: a first encapsulated elbow hinge configured to attach to a first housing of the power transfer unit at an aperture of the first housing; a second encapsulated elbow hinge configured to attach to a second housing of the power transfer unit at an aperture of the second housing; and a telescoping tubular assembly. The telescoping tubular assembly includes an inner tube telescopically connected to an outer tube, and each of the inner tube and the outer tube includes an end attached to a respective one of the first and second encapsulated elbow hinges.

In the first embodiment, each of the first and second encapsulated elbow hinges includes: an encapsulating member, including: a tubular portion extending along a first longitudinal end of the encapsulated elbow hinge, the tubular end portion rotatingly attached through the aperture of the first or the second housing; and a u-shaped portion comprising spaced ears extending along a second longitudinal end of the encapsulated elbow hinge in a direction perpendicular to the first or the second housing; and an encapsulated member pivotally attached to the encapsulating member between the spaced ears by a pivot connector.

In a second embodiment, a tubular assembly for a power transfer unit includes: a first encapsulated elbow hinge configured to attach to a first housing of the power transfer unit at an aperture of the first housing; a second encapsulated elbow hinge configured to attach to a second housing of the power transfer unit at an aperture of the second housing; and a telescoping tubular assembly including: an inner tube telescopically connected to an outer tube. In the second embodiment, the inner tube includes: a telescoping section that retracts into and extends out of the outer tube, where the telescoping section is flared at its end; and a second section directly coupled to one of the first and second encapsulated elbow hinge. The outer tube includes a crimped end having an inner diameter less than the outer diameter of the flared end; and a second end directly coupled to one of the first and second encapsulated hinges.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the embodiments and invention can be practiced with modification and alteration, and that the invention be limited only by the claims and the equivalents thereof.

DETAILED DESCRIPTION OF THE DRAWINGS

In accordance with embodiments, a power transfer unit with a novel tubular assembly for transferring electric power or signals from a closable member to a frame is disclosed. In a first embodiment of the disclosed power transfer unit, the tubular assembly includes an encapsulated elbow hinge design with a reduced profile that permits substantially off-center installation of the housings of the power transfer unit. In a second embodiment of the disclosed power transfer unit, the tubular assembly includes an inverted, telescoping tubing design that does not detach during installation and use, and in some implementations may act as a stop for a closable member.

In various embodiments, the disclosed power transfer unit could be adapted for use and installation with a variety of door and doorframe designs where the transfer of electrical wiring or where a conduit between the door and doorframe is required. For example, the disclosed power transfer unit may be installed in building doors, aircraft doors, terrestrial vehicle doors, and the like. Moreover, it should be noted that although embodiments of the power transfer unit disclosed herein will be described with reference to doors and doorframes, one having skill in the art would appreciate that the disclosed power transfer unit could be used with other closable members such as windows.

FIGS. 1A-1D illustrate an exemplary environment in which the disclosed power transfer unit 100 may be implemented. As shown, power transfer unit 100 shields wires 305 transferring electrical power and/or data from doorframe 200 to door 300. Power transfer unit 100 includes a tubular assembly 170, a doorframe housing 180B installed in doorframe 200, and door housing 180A installed in door 300. As door 300 rotates from an open position (FIG. 1A) to a fully closed position on doorframe 200 (FIG. 1B), tubular assembly 170 rotates and collapses into housings 180A-180B, thereby being completely contained in door 300 and doorframe 200 in the closed position.

In implementations, power transfer unit 100 may be used in conjunction with a door hinge (not shown) that guides the opening and closure of swinging door 300. For example, the hinge may include a cam lift hinge, a butt hinge, an offset pivot hinge, or other suitable hinge for use with power transfer unit 100.

Figure 1A:
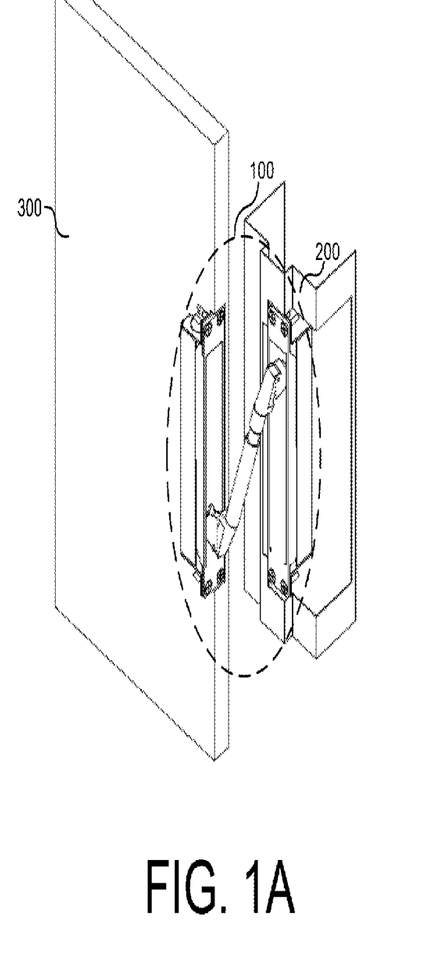
FIG. 1A illustrates an exemplary environment in which the disclosed power transfer unit may implemented, with a door in an open position.
Figure 1B:
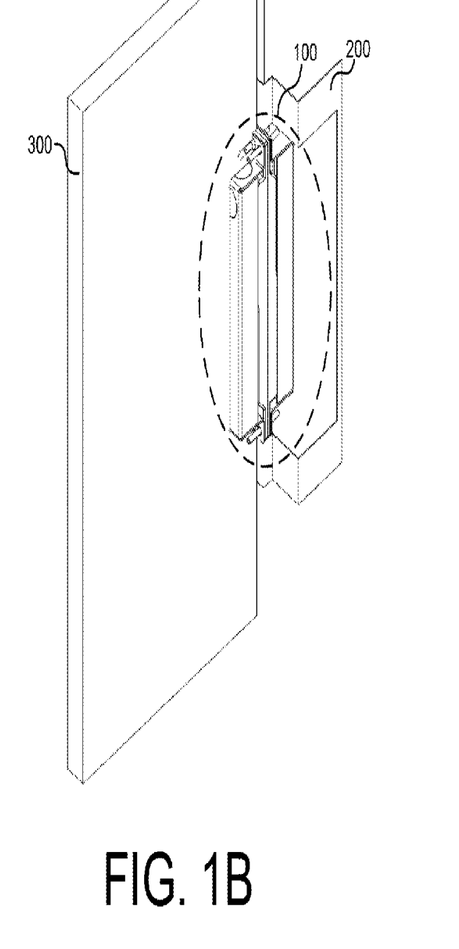
FIG. 1B illustrates an exemplary environment in which the disclosed power transfer unit may implemented, with a door in a closed position.
Figure 1C:
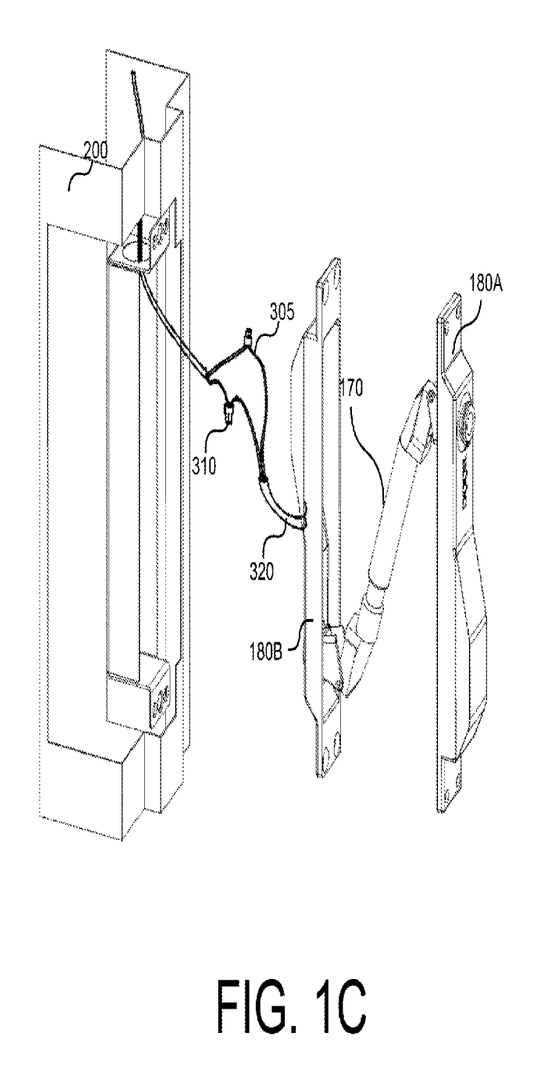
FIG. 1C illustrates an example installation of the disclosed power transfer unit in accordance with embodiments.
Figure 1D:
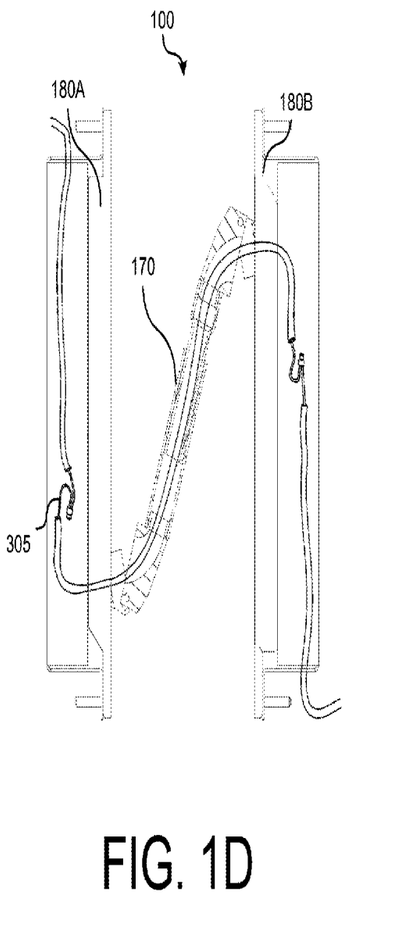
FIG. 1D is a schematic, sectional plan view illustrating wiring passing through the disclosed power transfer unit in accordance with embodiments.

As shown in FIGS. 1C-1D, wiring 305 passes from doorframe 200 to doorframe housing 180B, through tubular assembly 170 into door housing 180A, and into door 300. A sheath or hollow conduit 320 may be included to protect and organize a bundle of wiring 305. Additionally, wire connectors or housings 310 may be provided to install and organize wiring 305 (e.g., using color-coded terminal connectors). In some embodiments, the number of wires of wiring 305 that pass through power transfer unit 100 may depend on an existing installation of wires between doorframe 200 to door 300, the minimum circumference of tubular assembly 170, the flexibility of the wiring 305, the wiring gauge, the amount of space available in doorframe 200 and door 300, and the like. For example, in a particular implementation, wiring 305 includes between (2) and (20) 12-24 gauge power wiring and (1) Cat 5, Cat 5e, or Cat 6 Ethernet cable.

Figure 2:
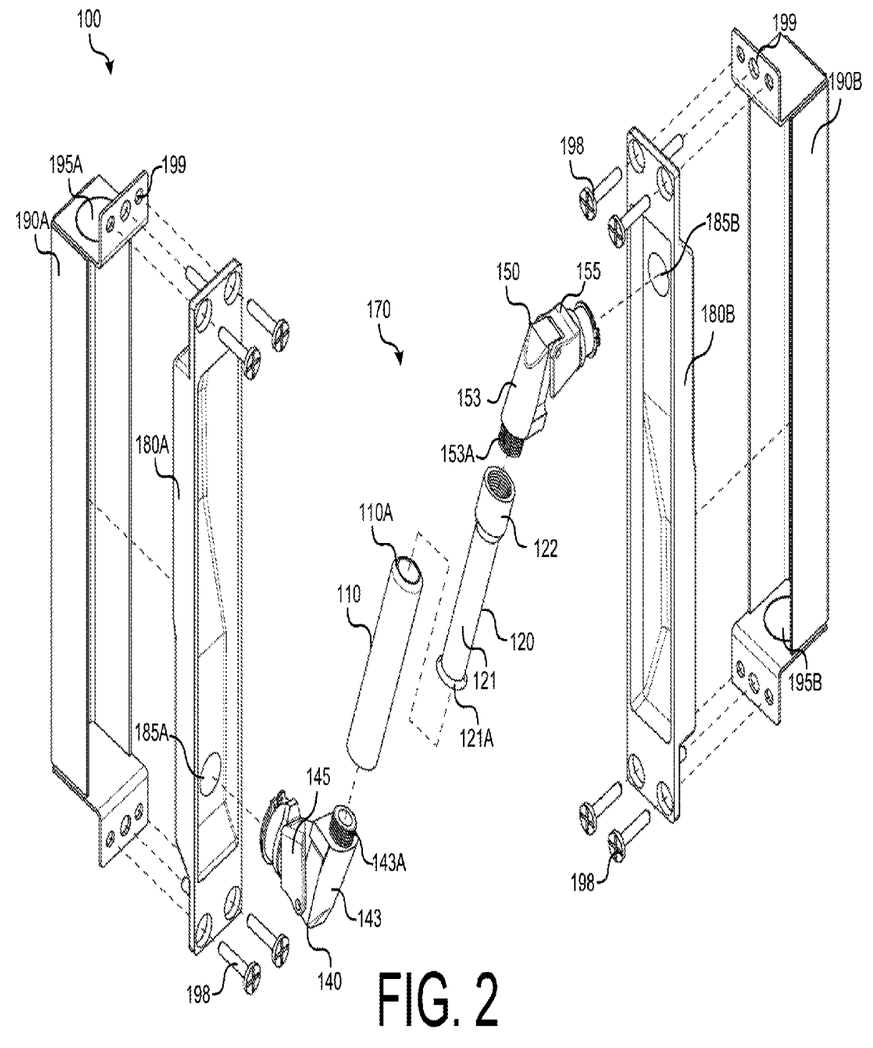
FIG. 2 is an exploded perspective view of a power transfer unit in accordance with embodiments of the disclosed technology

FIG. 2 is an exploded perspective view of power transfer unit 100 in accordance with embodiments of the disclosed technology. FIG. 2 will be described in conjunction with FIGS. 3A-3C, which illustrate an installed power transfer unit 100 transitioning from an open to a closed position, which coincides with the open and closed position of the door 300 within the door frame 200. Power transfer unit 100 includes electrical back boxes 190A-190B, housings 180A-180B and tubular assembly 170.

Each electrical back box 190A-190B includes one or more tabs 195A-195B for passing wiring from a door or doorframe. In some embodiments, a wire strain relief (not shown) is installed in tabs 195A-195B to hold one or more wires running through power transfer unit 100. During installation, each electrical back box 190A-190B is installed in a respective cavity of a door or doorframe. Apertures 199 at the top and bottom of electrical back boxes 190A-190B receive fasteners 198 (e.g., screws, pins, nails, etc. . . . ) that secure and align a respective housing 180A-180B to the back box 190A-190B, and in some embodiments secure the back box to the cavity of a door or doorframe.

Tubular assembly 170 is pivotally and hingededly coupled with the housing 180A-180B. Tubular assembly 170 includes an outer tube 110, an inner tube 120 telescopically coupled to outer tube 110, and elbow hinges 140 and 150 coupled to a respective one of outer tube 110 and inner tube 120.

Each elbow hinge 140, 150 includes an encapsulating member 145, 155 with a tubular end portion inserted through a hole 185A, 185B of a housing 180A, 180B. In particular embodiments, the diameter of holes 185A, 185B is between 0.5 and 1.5 inches. The tubular end portion is retained in the housing by a retaining means such as a snap ring, lip, washer or some combination thereof and may allow for relative rotational and lateral movement between the components. For example, as power transfer unit 100 is opened or closed, encapsulating members 145, 155 freely rotate with respect to housing 180A, 180B. Further, subject to the limitations imposed by the retaining means, encapsulating members 145, 155 may move in and out of holes 185A, 185B as power transfer unit 100 is opened and closed so as to reduce the overall length of the tubular assembly 170 that extends between the housing 180A, 180B.

The other end of encapsulating members 145, 155 couple to (e.g., by one or more pivot pins) and encapsulate an encapsulated member 143, 153 that swivels between members 145, 155 as power transfer unit 100 is opened and closed. In embodiments, illustrated by FIG. 2A, encapsulated members 143, 153 include a threaded end 143A, 153B that is threadably engaged to an inside end of inner tube 120 or outer tube 110. In alternative embodiments, the ends of encapsulated members 143, 153 may be attached to tubes 110-120 by welding, gluing, snap ring, or other suitable attachment means. Furthermore, it is further contemplated that the attachment between the ends of the encapsulated members 143, 153 and tubes 110-120 may permit relative rotational or lateral movement between the components.

Figure 3A:
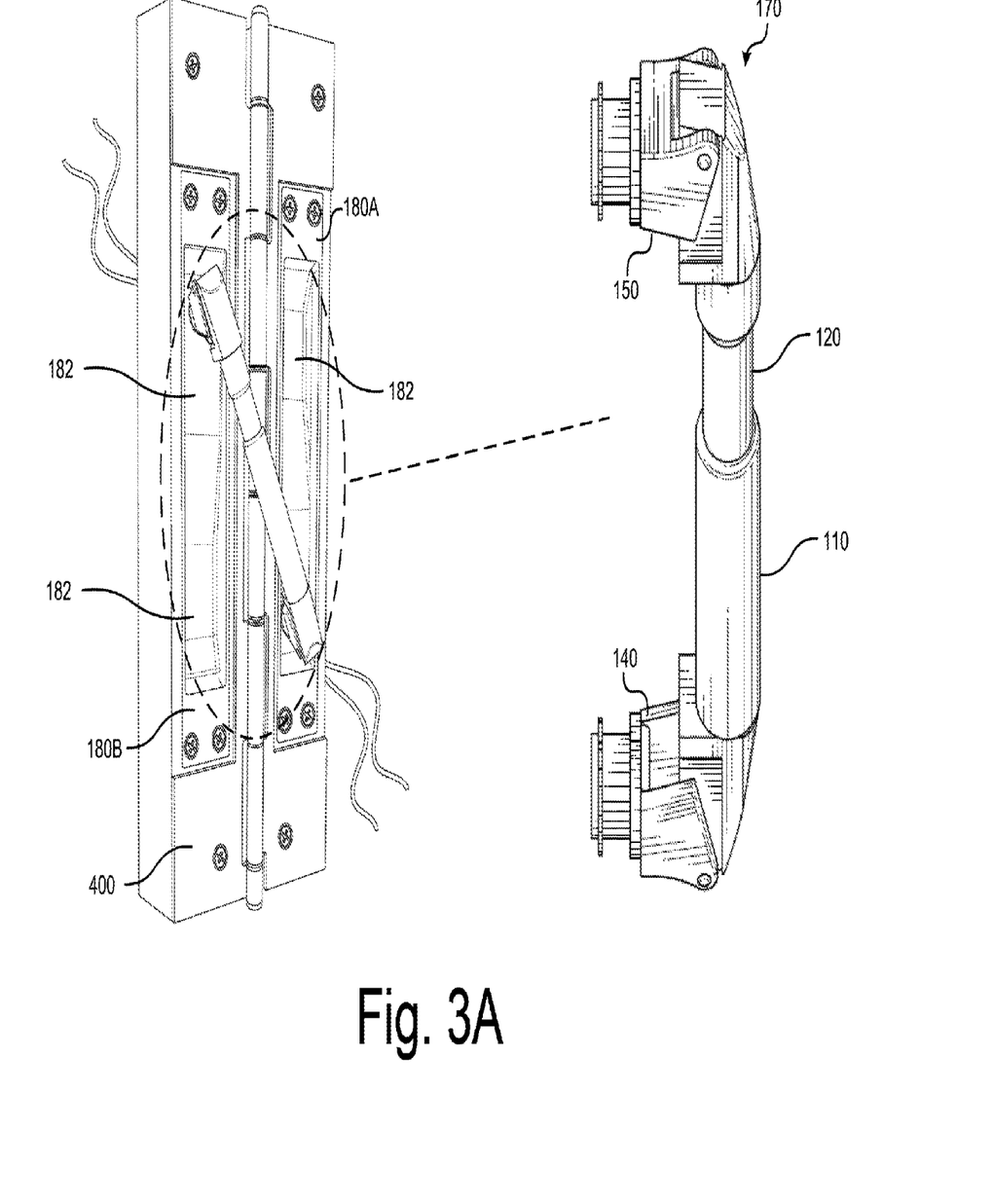
FIG. 3A is a perspective view illustrating an embodiment of an open power transfer unit in accordance with the disclosed technology.

Starting from a 180° open position illustrated by FIG. 3A, tubular assembly 170 includes inner tube 120 telescopically extended out of outer tube 110, and elbow hinges 140, 150 facing in a same direction. In this position, housings 180A and 180B are aligned in the same plane. In embodiments, the maximum opening angle of power transfer unit 100 (and its corresponding door) may depend on the maximum angle of door hinge 400, walls parallel to the door, or the maximum extension of inner tube 120 with respect to outer tube 110.

In implementations where the maximum extension of inner tube 120 out of outer tube 110 provides a maximum opening angle, tubular assembly 170 may effectively act as a doorstop that is durable and does not come apart during use. More particularly, as illustrated in FIG. 2, the end 110A of outer tube 110 that attaches to inner tube 120 is crimped, and the end 121A of inner tube 120 that attaches to outer tube 110 is flared. In this manner, when flared end 121A contacts crimped end 110A, inner tube 120 reaches its maximum extension out of outer tube 110 and assembly 170 (and power transfer unit 100 and door 300) is prevented from opening further.

Figure 3B:
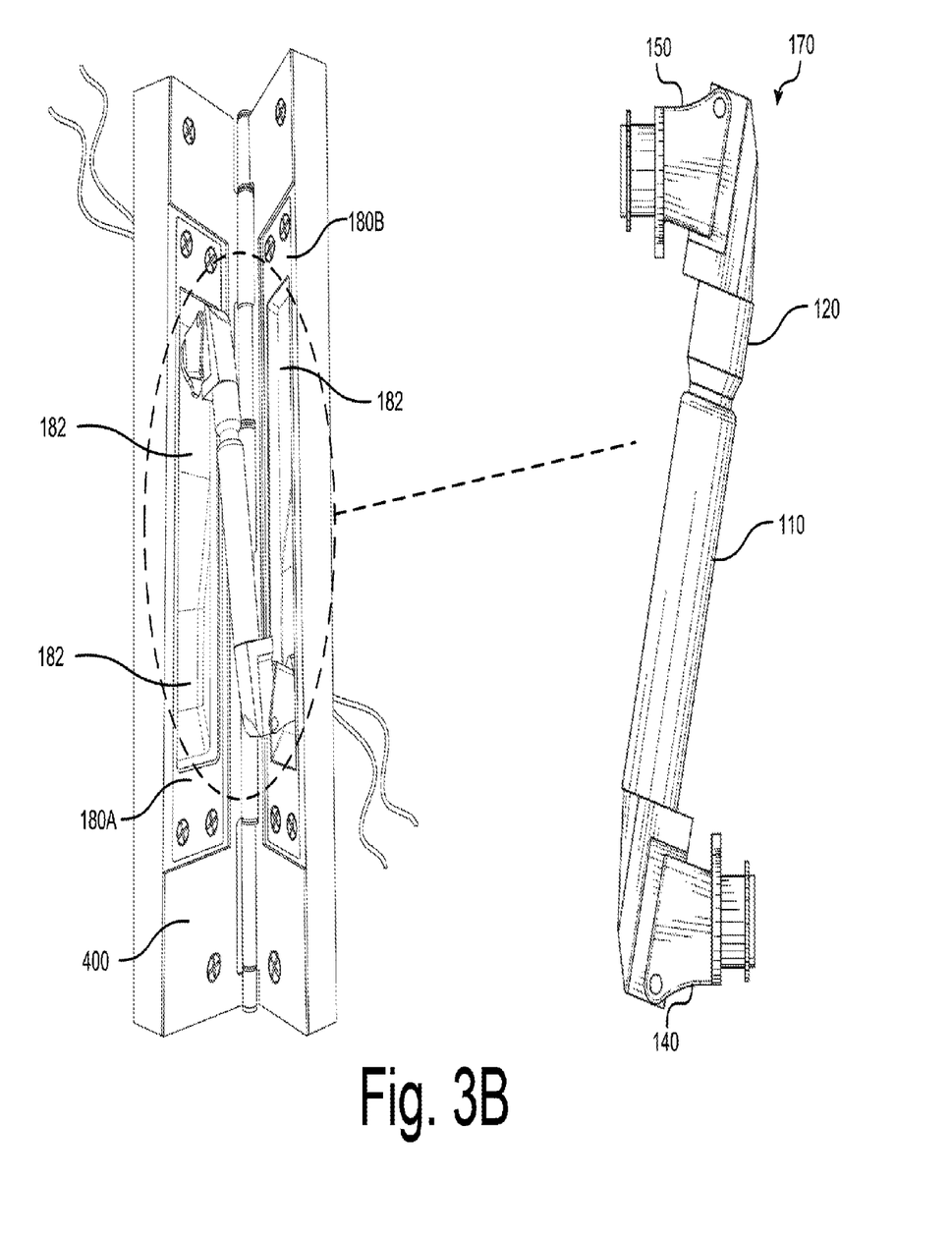
FIG. 3B is a perspective view illustrating the power transfer unit of FIG. 3A in a partially closed position.

As the door 300 closes, illustrated by FIG. 3B, tubular assembly 170 begins to collapse into the recesses 182 of housings 180A, 180B. Specifically, inner tube 120 retracts into outer tube 110, elbow hinges 140, 150 begin pointing in opposite directions, and one of inner tube 120 or outer tube 110 rotate depending on the direction that the door closes. For example, in embodiments where housing 180A closes on housing 180B, outer tube 110 may rotate in the direction of closure. Conversely, in embodiments where housing 180A closes on housing 180B, inner tube 120 would rotate in the direction of closure. At the same time, encapsulated members 145, 155 rotate at their attachment point with respect to housing 180A, 180B, and encapsulated members 143, 153 swivel inward between the ears of their respective encapsulating member 145, 155.

Figure 3C:
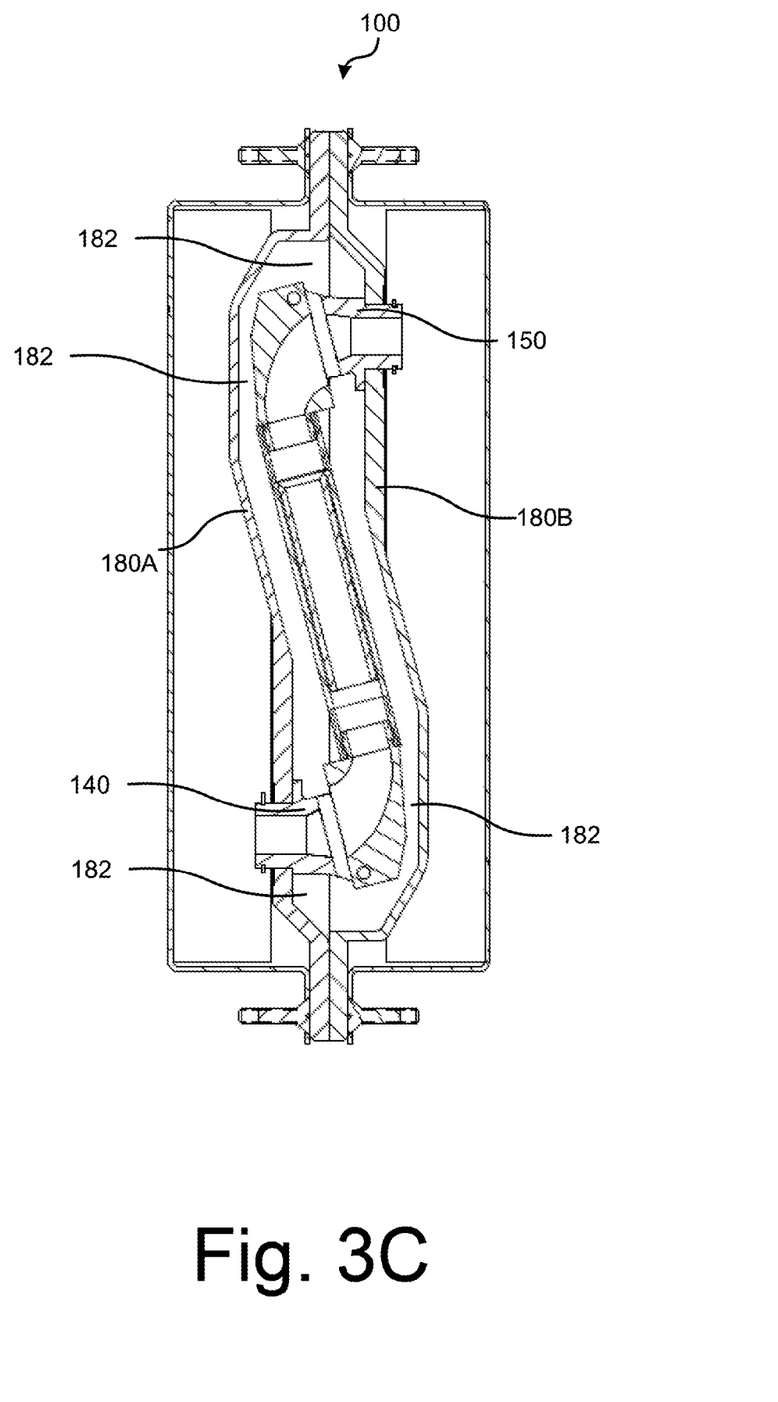
FIG. 3C is a schematic, sectional plan view illustrating an embodiment of a power transfer unit in accordance with the disclosed technology.

FIG. 3C is a schematic, sectional plan view illustrating an embodiment of power transfer unit 100 in the closed position. In this position, the surfaces of housing 180A and housing 180B are aligned horizontally and vertically and completely contain tubular assembly 170 in recesses 182. Elbow hinges 140, 150 point in opposite directions, inner tube 120 is collapsed into outer tube 110, and the components of tubular assembly 170 are angled to fit in recesses 182.

As noted above, in conventional designs if the doorframe housing and door housing are misaligned even slightly during installation (e.g., by 1/16 of an inch), the power transfer unit elbows will not be completely contained within the recesses of the housing and may rub with the housing or even prevent closure of the door. By contrast, the disclosed encapsulated elbow hinges 140, 150 provide a reduced profile that permits substantially off-center installation of the housings of the power transfer unit (e.g., up to 3/16 of an inch) such that hinges 140 and 150 will still fit in recesses 182. The reduced profile is made possible by locating encapsulated members 143, 145 within the openings formed within the encapsulating members 145, 155.

For example, FIGS. 4A-4D illustrate a design for an exemplary encapsulated elbow hinge 500 in accordance with embodiments. Encapsulated elbow hinge 500 includes an encapsulated member 520 rotatingly coupled between ears 512 of encapsulating member 510 using one or more pivot connectors 530. In embodiments, pivot connector 530 may be a pivot pin, a clevis pin, a dowel, a bolt and screw, and the like.

Figure 4A:
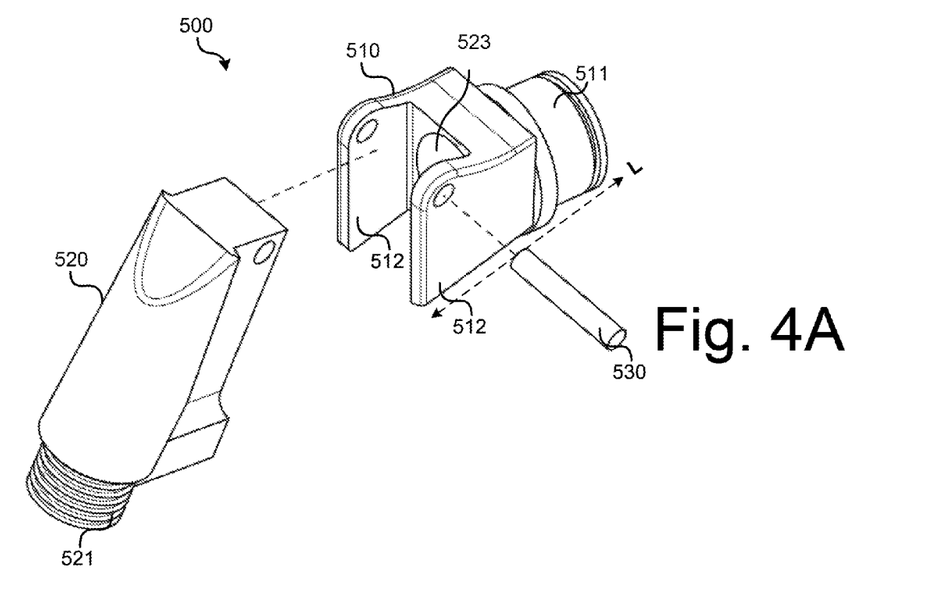
FIG. 4A is an exploded perspective view of an encapsulated elbow hinge that may be used in embodiments of the disclosed power transfer unit.
Figure 4B:
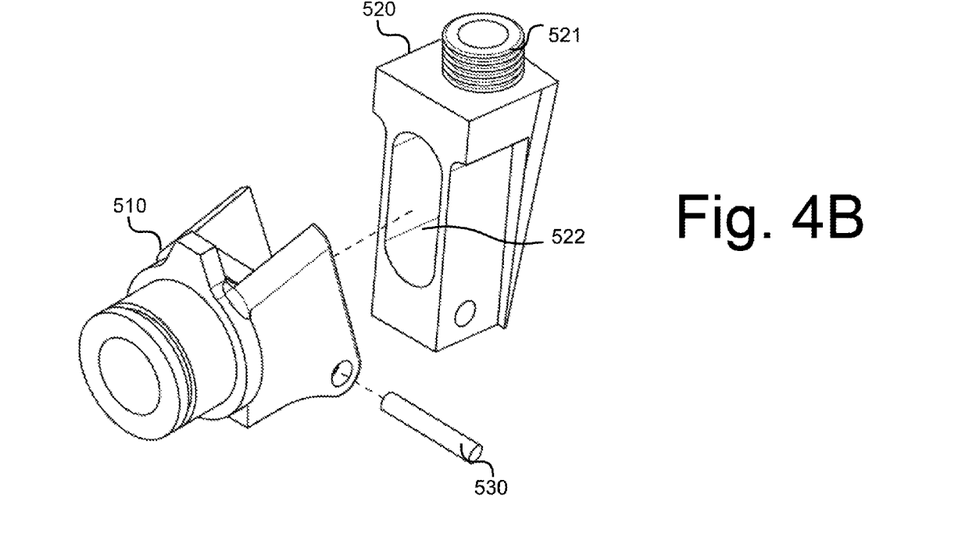
FIG. 4B is another exploded perspective view illustrating the encapsulated elbow hinge of FIG. 4A.

Encapsulating member 510 includes a tubular end portion 511 along a first longitudinal end of member 510 and a u-shaped end portion 512 along a second longitudinal end of member 510. The longitudinal axis (l) of member 510 is illustrated in FIG. 4A. During operation, tubular end portion 511 is retained in an aperture of a power transfer unit housing by a retaining means (e.g., a snap ring, lip, washer, and the like), and is configured to rotate about the housing as the power transfer unit opens and closes. U-shaped portion 512 includes spaced ears that extend along the second longitudinal end of member 510 in a direction perpendicular to the surface of the power transfer unit housing. During operation, U-shaped portion 512 provides a recess for encapsulating encapsulated member 520 as it swivels into and out of the space between the ears. In preferred embodiments, illustrated by FIGS. 4A-4B, the spaced ears are approximately parallel. An aperture 523 at the base of u-shaped portion, between the spaced ears, passes wiring running through tubular end portion 511 to encapsulated member 520.

Encapsulated member 520 includes a first end pivotally attached between the spaced ears of u-shaped portion 512, a second end 521 configured to attach to an outer or inner tube of the power transfer unit, and an aperture 522 for passing wiring through member 520 and out of end 521. As illustrated in this embodiment, end 521 is threaded and configured to be threadably engaged to an inside end of an inner or outer tube of the power transfer unit. Alternatively, end 521 may be attached to the inner or outer tube by welding, gluing, or other suitable attachment means.

Figure 4C:
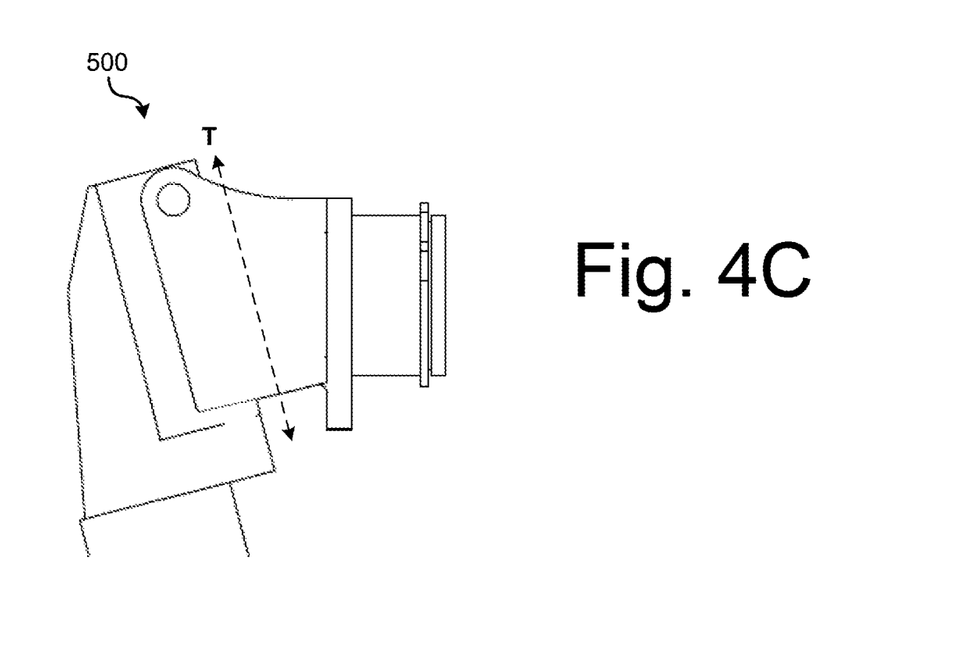
FIG. 4C is a side plan view of an encapsulated elbow hinge of a power transfer unit after it is closed, in accordance with disclosed embodiments.
Figure 4D:
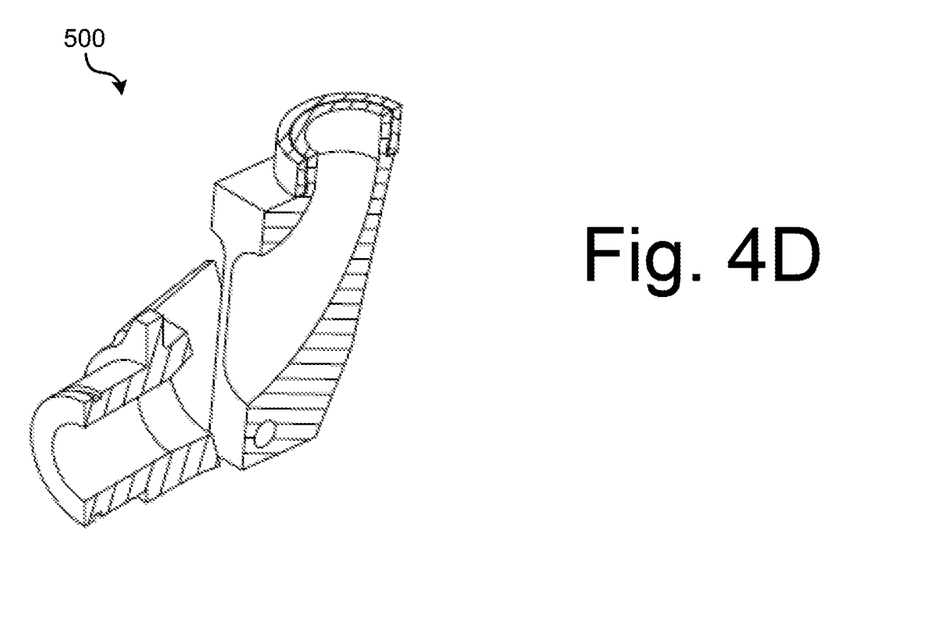
FIG. 4D is a cross-sectional, schematic view illustrating the inside of an encapsulated elbow hinge of a power transfer unit through which wiring may be passed, in accordance with disclosed embodiments.

During operation, encapsulated member 520 swivels into encapsulating member 510, between ears 512, as the power transfer unit is closed to minimize the total housing recess space occupied by elbow hinge 500. FIG. 4C is an assembled side view of encapsulated elbow hinge 500, illustrating this closed position. As illustrated in this embodiment, member 510 is approximately parallel along a transverse end (t) of ears 512 and is angled along the recess of a housing (not shown) to provide a reduced profile. FIG. 4D is a cross-sectional, schematic view illustrating the inside of encapsulated elbow hinge 500 through which wiring may be passed.

Figure 5A:
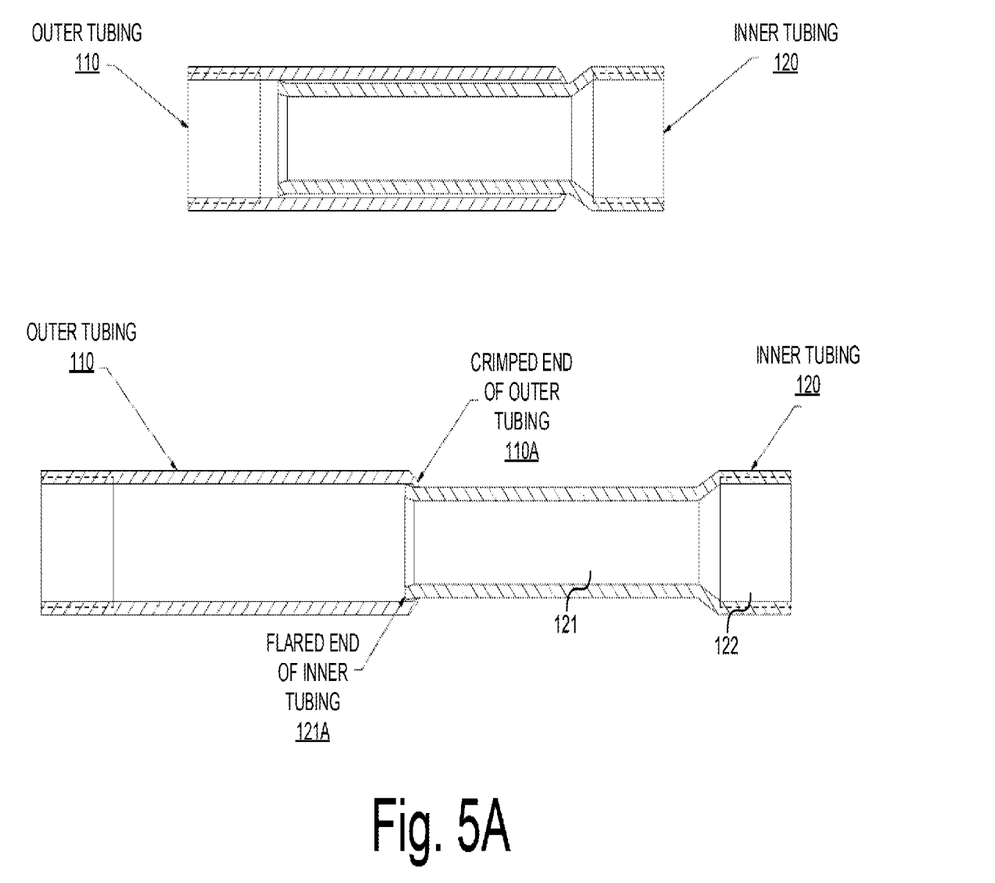
FIG. 5A is a schematic, sectional plan view illustrating an embodiment of the telescoping tubing assembly of the disclosed power transfer unit.
Figure 5B:
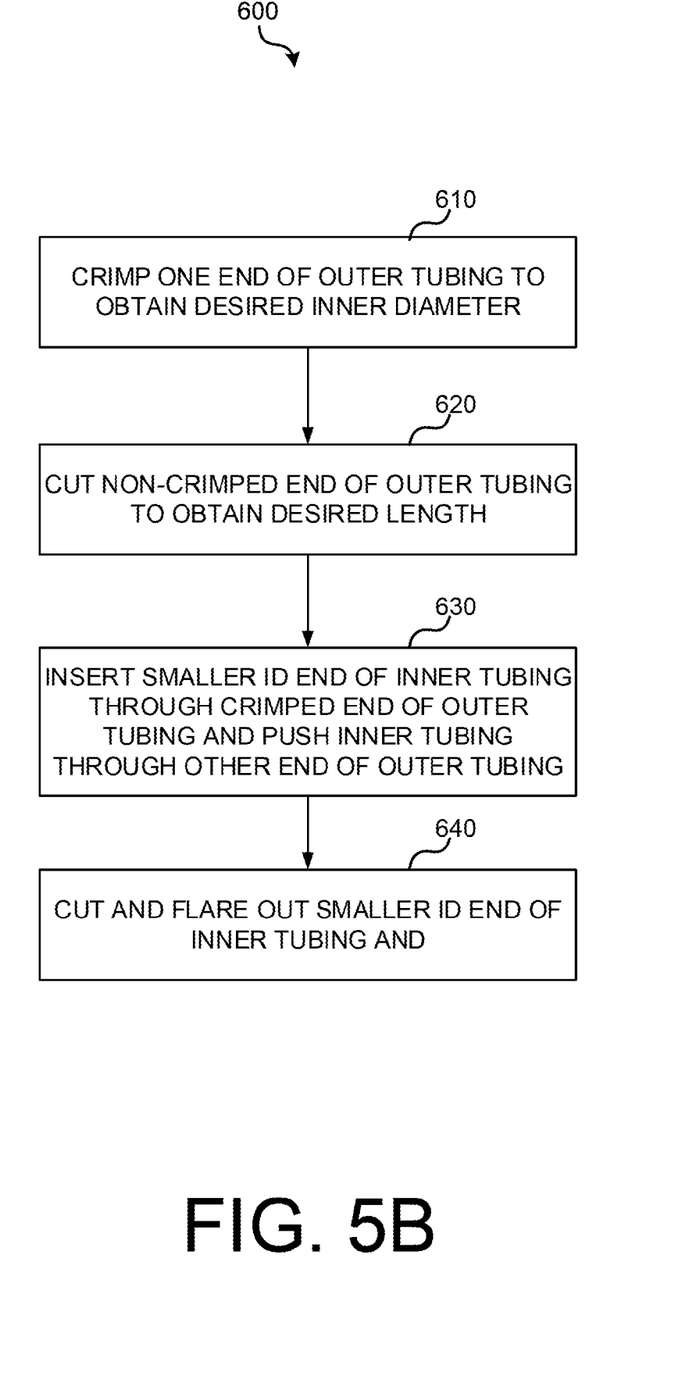
FIG. 5B is an operational flow diagram illustrating an example method for manufacturing the telescoping tubing assembly of the disclosed power transfer unit.

FIG. 5B is an operational flow diagram illustrating an example method 600 for manufacturing the telescoping tubing assembly of power transfer unit 100. FIG. 5B will be described with reference to FIG. 5A, which is a schematic, sectional plan view illustrating the telescoping tubing assembly of power transfer unit 100, including an inner tube 120 with a thinner portion 121 that telescopes into and out of outer tube 110. In embodiments, the tubing assembly may be made of steel, aluminum, carbon fiber, or other suitable material.

In embodiments, prior to beginning method 600, inner tube 120 may be machined and tapped to form a thinner, telescoping portion 121 and a thicker portion 122. At operation 610, a first end of outer tube 110 is crimped to obtain a crimped end 110A with a desired inner diameter less than the original diameter of outer tube 110. At operation 620, the non-crimped end of outer tube 110 is cut to a desired length.

In embodiments, this desired length may depend on the dimensions and positions of the recesses in the housings of the power transfer unit, and the final length of thinner portion 121 of inner tube 120. At operation 630, thinner portion 121 of inner tube 120 is inserted into one end of outer tube 110 and pushed or slid through the other end of outer tube 110. At operation 640, the end of thinner portion 121 that was pushed through outer tube 110 is cut and flared out to obtain a flared end 120A with an outer diameter greater than the inner diameter of crimped end 110A and less than the inner diameter of the remainder of outer tube 110.

During opening and closure of the power transfer unit, thinner section 121 of inner tube 120 telescopically extends into and out of outer tube 110A. Because the inner diameter of the crimped end 110A of outer tube 110 is greater than the outer diameter of the flared end 121A of inner tube 120, this effectively acts as a stop the prevents accidental disassembly of the assembly, and in some embodiments may be used to set the maximum opening angle of a power transfer unit. In implementations of such embodiments, crimped end 110A and flared end 121A may be reinforced using tubular reinforcement methods known in the art.

In embodiments, the inner diameter of thicker section 122 of inner tube 120 is the same as the inner diameter of outer tube 110. In this manner, the encapsulated elbow hinges may be uniformly designed to attach to either end of the tubing assembly.

While various embodiments have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A power transfer unit, comprising:
   a tubular assembly, comprising:
      a first elbow hinge;
      a second elbow hinge; and
      an inner tube telescopically connected to an outer tube, wherein:
         the inner tube comprises:
            a telescoping section that retracts into and extends out of the outer tube, wherein the telescoping section is flared at its end; and
            a section directly coupled to the first elbow hinge; and
         the outer tube comprises:
            a crimped end having an inner diameter less than an outer diameter of the flared end; and
            a second end directly coupled to the second elbow hinge,
         wherein an outer diameter of the section of the inner tube directly coupled to the first elbow hinge is greater than an outer diameter of the telescoping section, and wherein an inner diameter of the section of the inner tube directly coupled to the first elbow hinge is the same as an inner diameter of the outer tube; and
   first and second housings, each of the first and second housings comprising an aperture for passing wiring, wherein the first elbow hinge is attached to the first housing at the first housing's aperture, and wherein the second elbow hinge is attached to the second housing at the second housing's aperture.

2. The power transfer unit of claim 1, further comprising: first and second electrical back boxes, wherein each of the first and second housings is installed on a respective one of the first and second electrical back boxes.

3. The power transfer unit of claim 2, further comprising: one or more wires connected to a power or data source at the first and second electrical back boxes, wherein the one or more wires extend through an interior of the tubular assembly into the first and second electrical back boxes.

4. The power transfer unit of claim 1, wherein at least one of the elbow hinges is an encapsulated elbow hinge, comprising:
   an encapsulating member comprising a u-shaped portion comprising spaced ears extending along a longitudinal end of the encapsulated hinge; and
   an encapsulated member attached to the encapsulating member between the spaced ears, wherein the u-shaped portion provides a recess for at least partially encapsulating the encapsulated member as it swivels into and out of a space between the ears.

5. The power transfer unit of claim 4, wherein the encapsulating member is directly attached through the aperture of the first or the second housing.

6. An apparatus, comprising:
a tubular assembly for a power transfer unit, comprising:
   a first elbow hinge;
   a second elbow hinge; and
   a telescoping tubular assembly comprising an inner tube telescopically connected to an outer tube, wherein an end of the inner tube is attached to the first elbow hinge and wherein an end of the outer tube is attached to the second elbow hinge;
   wherein the first elbow hinge comprises:
      an encapsulating member, comprising: a u-shaped portion comprising spaced ears extending along a longitudinal end of the first elbow hinge, wherein the spaced ears extend along the longitudinal end in a direction perpendicular to a housing of the power transfer unit when the tubular assembly is attached to the power transfer unit; and
      an encapsulated member pivotally attached to the encapsulating member between the spaced ears by a pivot connector, wherein the u-shaped portion provides a recess for at least partially encapsulating the encapsulated member as it swivels into and out of a space between the ears.

7. The apparatus of claim 6, wherein the encapsulating member further comprises: a tubular end portion extending along a second longitudinal end of the first elbow hinge.

8. The apparatus of claim 7, wherein the u-shaped portion comprises a base between the spaced ears, the base comprising an aperture for receiving wiring passed through the tubular end portion.

9. The apparatus of claim 8, further comprising: first and second housings, each of the first and second housings comprising an aperture for passing wiring, wherein the first elbow hinge is attached to the first housing at the first housing's aperture, and wherein the second elbow hinge is attached to the second housing at the second housing's aperture, wherein the tubular end portion is configured to rotatingly attach through the aperture of the first housing.

10. A method of manufacturing a telescoping tubular assembly of a power transfer unit, the method comprising:
   crimping a first end of an outer tube to obtain a crimped end having an inner diameter less than an inner diameter of a second end of the outer tube that was not crimped;
   inserting a first end of an inner tube through the crimped end of the outer tube and pushing the first end of the inner tube through the second end of the outer tube;
   after pushing the first end of the inner tube through the second end of the outer tube, cutting and flaring out the first end of the inner tube to obtain a flared end, wherein the flared end has an outer diameter greater than an inner diameter of the crimped end and less than an inner diameter of the second end of the outer tube that was not crimped; and
   attaching a first elbow hinge to a second end of the inner tube and attaching a second elbow hinge to the second end of the outer tube,
   wherein the inner tube comprises a thinner telescoping portion including the flared end, wherein the second end of the inner tube has an inner diameter greater than an inner diameter of the thinner telescoping portion.

11. The method of claim 10, further comprising: prior to inserting the first end of the inner tube, machining the inner tube to form the thinner telescoping portion.

12. The method of claim 11, further comprising: cutting a second, non-crimped end of the outer tube to a desired length.

13. The method of claim 10, wherein the power transfer unit comprises first and second housings, each of the first and second housings comprising an aperture for passing wiring, wherein the first elbow hinge is configured to attach to the first housing at the first housing's aperture, and wherein the second elbow hinge is configured to attach to the second housing at the second housing's aperture.

14. The method of claim 13, wherein the second end of the inner tube has an inner diameter equal to the inner diameter of the second end of the outer tube.

15. The method of claim 14, wherein the first elbow hinge and the second elbow hinge have the same structure.

16. The method of claim 14, wherein the first elbow hinge is threadably engaged to an inside of the second end of the inner tube, and wherein the second elbow hinge is threadably engaged to an inside of the second end of the outer tube.

17. A telescoping tubular assembly of a power transfer unit formed by a process, the process comprising:
   crimping a first end of an outer tube to obtain a crimped end having an inner diameter less than an inner diameter of a second end of the outer tube that was not crimped;
   inserting a first end of an inner tube through the crimped end of the outer tube and pushing the first end of the inner tube through the second end of the outer tube;
   after pushing the first end of the inner tube through the second end of the outer tube, cutting and flaring out the first end of the inner tube to obtain a flared end, wherein the flared end has an outer diameter greater than an inner diameter of the crimped end and less than an inner diameter of the second end of the outer tube that was not crimped; and
   attaching a first elbow hinge to a second end of the inner tube and attaching a second elbow hinge to the second end of the outer tube,
   wherein the inner tube comprises a thinner telescoping portion including the flared end, wherein the second end of the inner tube has an inner diameter greater than an inner diameter of the thinner telescoping portion.

18. The telescoping tubular assembly of claim 17, wherein the power transfer unit comprises first and second housings, each of the first and second housings comprising an aperture for passing wiring, wherein the first elbow hinge is configured to attach to the first housing at the first housing's aperture, and wherein the second elbow hinge is configured to attach to the second housing at the second housing's aperture.

19. The telescoping tubular assembly of claim 18, wherein the second end of the inner tube has an inner diameter equal to the inner diameter of the second end of the outer tube.

* * * * *